July 24, 1934.   R. W. MILLER   1,967,678
FISHING REEL
Filed Sept. 25, 1933
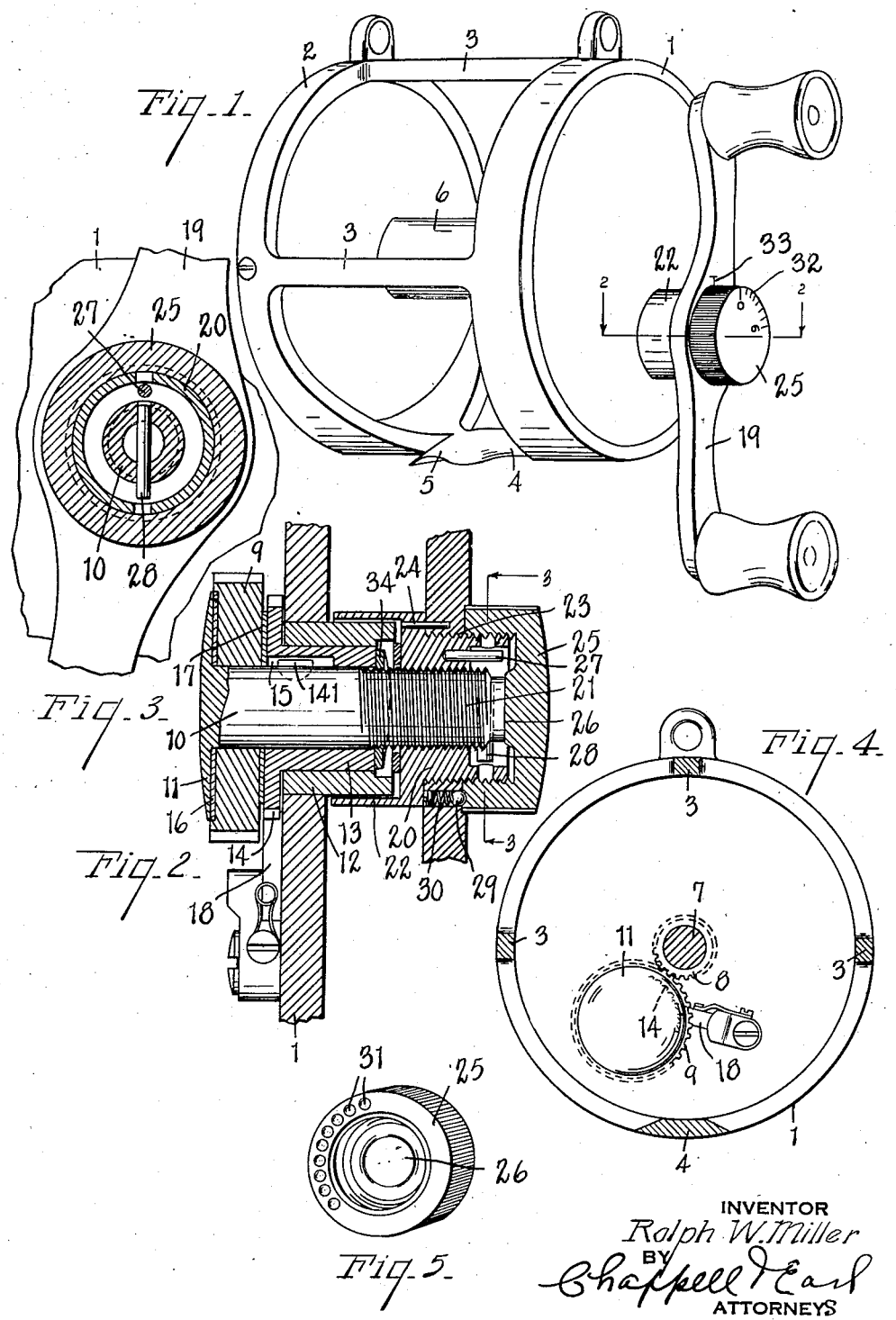
INVENTOR
Ralph W. Miller
BY
Chappell & Earl
ATTORNEYS Patented July 24, 1934

1,967,678

UNITED STATES PATENT OFFICE 1,967,678

FISHING REEL

Ralph W. Miller, Glendale, Calif.

Application September 25, 1933, Serial No. 690,799

20 Claims. (Cl. 242—84.5)

The main objects of this invention are:

First, to provide a fishing reel having a means for releasing the spool controlled through the crank.

Second, to provide a fishing reel with braking means controlled through or by means of the crank.

Third, to provide a fishing reel having these advantages in which the braking action on the spool may be very quickly and easily regulated or adjusted.

Fourth, to provide a fishing reel having these features which is simple and economical in its parts and very efficient in operation and easy to manipulate.

Objects relating to details and economies of my invention will appear from the description to follow. The invention is defined and pointed out in the claims.

A structure which is a preferred embodiment of my invention is illustrated in the accompanying drawing, in which:

Fig. 1 is a perspective view of a fishing reel embodying the features of my invention.

Fig. 2 is an enlarged fragmentary view mainly in section on line 2—2 of Fig. 1.

Fig. 3 is a fragmentary view sectioned on line 3—3 of Fig. 2.

Fig. 4 is a transverse vertical section through the frame of the reel, the spool other than its shaft being omitted.

Fig. 5 is a perspective view of the adjusting nut.

I have illustrated my improvements as I have embodied them in a large reel designed primarily for salt water fishing.

The frame comprises end members 1 and 2 connected by pillars or crosspieces 3 and 4, the crosspiece 4 carrying the reel seat 5. The spool 6 is journaled in the end members of the frame and its shaft 7 is provided with a pinion 8 meshing with the driving gear 9. This driving gear 9 is rotatably mounted on the shaft or spindle 10 having a flange-like friction clutch member 11 at its inner end.

The frame is provided with a bearing 12 for the hub 13 of the ratchet member 14 which is splined to the shaft 10, a spline key being shown at 141, and engaging a longitudinal spline groove 15. The hub of the ratchet wheel thus becomes a bearing part for the shaft, and the ratchet wheel is disposed at the side of the gear and constitutes a friction clutch member.

A friction disk 16 is arranged between the gear and the clutch member 11 and a corresponding friction disk 17 is arranged between the ratchet wheel and the gear 9.

A pawl 18 coacts with the ratchet wheel to limit its rotation in one direction so that when the clutch is in effective clutching engagement with the gear, these parts constitute a friction drag or brake for the spool.

A crank 19 is provided with a hub 20 internally threaded and mounted upon the threaded outer end 21 of the shaft 10. This crank hub has a sleeve 22 embracing the bearing 12 and constituting a guard or housing. The crank is threaded upon the crank hub which is threaded at 23 and secured by means of the pin 24.

The cap nut 25 is threaded upon the hub and has an internal boss 26 coacting with the end of the shaft so that by adjusting the nut, the clutch tightening movement of the crank hub on the shaft is limited by the cap coming into engagement with the end of the shaft. The rotative movement of the nut relative to the crank is limited by the stop pin 27 on the hub of the crank coacting with the stop pin 28 on the shaft.

A spring pressed detent which in the embodiment illustrated is a ball 29 supported by the spring 30 in the crank coacts with the spaced recesses 31 at the inner edge of the nut. This detent acts to hold the nut in its adjusted position and thus regulate the amount of clutching or drag action on the spool.

The forward rotation or line winding rotation of the crank tightens or sets the clutch, thereby connecting the crank to the spool, the amount of friction, however, being determined by the adjustment of the nut 25 which is preferably provided with positioning indicia indicated at 32 in Fig. 1, the crank having a pointer 33 associated with this indicia. The nut is knurled for convenience in adjustment.

A thrust spring 34 is arranged between the inner end of the crank hub and the outer end of the ratchet wheel hub.

With the parts thus arranged, the clutch action on the spool may be released by a rearward or reverse rotation of the crank and is immediately applied by the forward rotation thereof. The amount of friction or drag may be easily adjusted by means of the nut 25 and this is positioned for very convenient manipulation.

A further advantage of the structure is that the stresses are all centered or embodied in the working parts and there are relatively minor stresses on the frame.

The ratchet wheel acts to prevent reverse rotation of the shaft 10. Thus, when the line is being pulled out, as by a fish, or in casting, the clutch acts as a brake or drag owing to the fact that the shaft is held stationary, while the spool driving gear is reversely rotated by the spool. Such braking action of the clutch is under the control of the operator through the crank. Turning the crank to its forward position results in the maximum braking action for which the clutch is set. Turning the crank to its reverse position releases the braking action on the driving gear which thereupon turns freely on the shaft under the influence of the spool in reverse direction.

I have illustrated and described my improvements in an embodiment which I have found highly satisfactory in salt water reels. I have not attempted to illustrate or describe the adaptation of my improvements to reels designed for use in other relations as it is believed that this disclosure will enable those skilled in the art to which my invention relates to embody or adapt the same as may be desired.

Having thus described my invention, what I claim as new and desire to secure by Letters Patent, is:

1. In a fishing reel, the combination with a frame and a spool provided with a pinion, of a driving gear coacting with said pinion, a shaft on which said driving gear is rotatably mounted provided with a flange-like friction clutch member at its inner end, a ratchet wheel disposed at the side of said gear and constituting a friction clutch member cooperating therewith and provided with a hub splined to said shaft and constituting a bearing therefor, said frame being provided with a bearing for said ratchet wheel hub, a pawl on said frame coacting with said ratchet wheel, a crank provided with a hub threaded on the outer end of said shaft, an adjusting nut threaded upon the outer end of said crank hub to coact with the outer end of said shaft, said crank and shaft having coacting stops limiting the rotative movement of the crank on the shaft, and a spring detent on said crank coacting with said nut for retaining it in its adjusted position.

2. In a fishing reel, the combination with a frame and a spool provided with a pinion, of a driving gear coacting with said pinion, a shaft on which said driving gear is rotatably mounted provided with a flange-like friction clutch member at its inner end, a ratchet wheel disposed at the side of said gear and constituting a friction clutch member cooperating therewith and provided with a hub splined to said shaft and constituting a bearing therefor, said frame being provided with a bearing for said ratchet wheel hub, a pawl on said frame coacting with said ratchet wheel, a crank provided with a hub threaded on the outer end of said shaft, and an adjusting nut threaded upon the outer end of said crank hub to coact with the outer end of said shaft.

3. In a fishing reel, the combination with a frame and a spool provided with a pinion, of a driving gear coacting with said pinion, a shaft on which said driving gear is rotatably mounted provided with a flange-like friction clutch member at its inner end, a ratchet wheel disposed at the side of said gear and constituting a friction clutch member cooperating therewith and provided with a hub splined to said shaft and constituting a bearing therefor, said frame being provided with a bearing for said ratchet wheel hub, friction disks interposed between said driving gear and its said coacting clutch members, a pawl on said frame coacting with said ratchet wheel, a crank provided with a hub threaded on the outer end of said shaft, a spring arranged between said crank hub and ratchet wheel hub, and an adjusting nut threaded upon the outer end of said crank hub to coact with the outer end of said shaft.

4. In a fishing reel, the combination with a frame and a spool provided with a pinion, of a driving gear coacting with said pinion, a shaft on which said driving gear is rotatably mounted provided with a friction clutch member at its inner end, a ratchet wheel splined to said shaft at the side of said gear and constituting a friction clutch member cooperating therewith, a pawl on said frame coacting with said ratchet wheel, a crank provided with a hub threaded on the outer end of said shaft, a spring arranged between said crank hub and ratchet wheel hub, an adjusting nut threaded upon said crank hub to coact with the outer end of said shaft, said crank and shaft having coacting stops limiting the rotative movement of the crank on the shaft, and a spring detent on said crank coacting with said nut for retaining it in its adjusted position.

5. In a fishing reel, the combination with a frame and a spool provided with a pinion, of a driving gear coacting with said pinion, a shaft on which said driving gear is rotatably mounted provided with a friction clutch member at its inner end, a ratchet wheel splined to said shaft at the side of said gear and constituting a friction clutch member cooperating therewith, a pawl on said frame coacting with said ratchet wheel, a crank provided with a hub threaded on the outer end of said shaft, an adjusting nut threaded upon said crank hub to coact with the outer end of said shaft, said crank and shaft having coacting stops limiting the rotative movement of the crank on the shaft, and a spring detent on said crank coacting with said nut for retaining it in its adjusted position.

6. In a fishing reel, the combination with a frame and a spool provided with a pinion, of a driving gear coacting with said pinion, a shaft on which said driving gear is rotatably mounted provided with a friction clutch member at its inner end, a ratchet wheel splined to said shaft at the side of said gear and constituting a friction clutch member cooperating therewith, a pawl on said frame coacting with said ratchet wheel, a crank provided with a hub threaded on the outer end of said shaft, a spring arranged between said crank hub and ratchet wheel hub, and an adjusting nut threaded upon said crank hub to coact with the outer end of said shaft.

7. In a fishing reel, the combination with a frame and a spool provided with a pinion, of a driving gear coacting with said pinion, a shaft on which said driving gear is rotatably mounted provided with a friction clutch member at its inner end, a ratchet wheel splined to said shaft at the side of said gear and constituting a friction clutch member cooperating therewith, a pawl on said frame coacting with said ratchet wheel, a crank provided with a hub threaded on the outer end of said shaft, and an adjusting nut threaded upon said crank hub to coact with the outer end of said shaft.

8. In a fishing reel, the combination with a frame and spool, of a driving gear for said spool, a shaft on which said driving gear is rotatably mounted, a friction clutch connection for said shaft and driving gear including a ratchet wheel, a crank threaded upon the outer end of said shaft, a nut threaded upon said crank to coact with said shaft, stops limiting the rotative adjustment of said crank on said shaft, a detent acting to yieldably hold said nut in its adjusted positions, and a spring interposed between said ratchet wheel and crank.

9. In a fishing reel, the combination with a frame and spool, of a driving gear for said spool, a shaft on which said driving gear is rotatably mounted, a friction clutch connection for said shaft and driving gear including a ratchet wheel, a crank threaded upon the outer end of said shaft, a nut threaded upon said crank to coact with said shaft, stops limiting the rotative adjustment of said crank on said shaft, and a spring interposed between said ratchet wheel and crank.

10. In a fishing reel, the combination with a frame and spool, of a driving gear for said spool, a shaft on which said driving gear is rotatably mounted, a friction clutch connection for said shaft and driving gear including a ratchet wheel, a crank threaded upon the outer end of said shaft, a cap threaded upon said crank to coact with said shaft, a detent acting to yieldably hold said nut in its adjusted positions, and a spring interposed between said ratchet wheel and crank.

11. In a fishing reel, the combination with a frame and spool, of a driving gear for said spool, a shaft on which said driving gear is rotatably mounted, a friction clutch connection for said shaft and driving gear, a crank threaded upon the outer end of said shaft, a nut threaded upon said crank to coact with said shaft, stops limiting the rotative adjustment of said crank on said shaft, and a detent acting to yieldably hold said nut in its adjusted positions.

12. In a fishing reel, the combination with a frame and spool, of a driving gear for said spool, a shaft on which said driving gear is rotatably mounted, a friction clutch connection for said shaft to said driving gear, a crank threaded upon the outer end of said shaft, and a nut threaded upon said crank to coact with said shaft.

13. In a fishing reel, the combination with a frame and spool, of a driving gear for said spool, a shaft on which said driving gear is rotatably mounted, a friction clutch connection for said shaft to said driving gear, a crank threaded upon the outer end of said shaft, and a cap nut threaded upon said crank to coact with the end of said shaft.

14. A fishing reel comprising in combination a driving shaft, a crank threaded upon said shaft, a cap threaded on said crank for adjustment to limit the inward travel of the crank relative to the shaft, means for holding the cap in its adjusted position, a spool driving means associated with said shaft including a friction clutch means controlled by the position of said crank on said shaft, and means for preventing reverse rotation of said shaft.

15. A fishing reel comprising in combination a driving shaft, a crank threaded upon said shaft, means mounted on said crank for adjustment to limit the travel of the crank relative to the shaft, a spool driving means associated with said shaft including a friction clutch means controlled by the position of said crank on said shaft, and means for preventing reverse rotation of said shaft.

16. A fishing reel comprising in combination a driving shaft, a crank hub threaded upon said shaft, means mounted on said hub for longitudinal adjustment to limit the inward travel of the hub relative to the shaft, and a spool driving means associated with said shaft including a friction clutch or brake or drag means controlled by the position of said hub on said shaft, and means for preventing reverse rotation of said shaft.

17. In a fishing reel, the combination with a frame and spool, of a driving means for said spool including a combined friction clutch and brake arranged within the frame, a crank having a lost motion driving connection with said combined friction clutch and brake, means for controlling said combined clutch and brake operatively associated with said crank to be actuated during the lost motion movement of the crank relative to its said driving connection to said clutch and brake, and means for adjusting the braking action disposed on the outside of the frame and operatively associated with said crank.

18. In a fishing reel, the combination with a frame and spool, of a driving means for said spool including a combined friction clutch and brake, a crank having a lost motion driving connection with said combined friction clutch and brake, means for controlling said combined clutch and brake operatively associated with said crank to be actuated during the lost motion movement of the crank relative to its said driving connection to said clutch and brake, and means for adjusting the braking action operatively associated with said crank.

19. In a fishing reel, the combination with a frame and spool, of a driving means for said spool including a combined friction clutch and brake, a crank having a lost motion driving connection with said combined friction clutch and brake, means for controlling said combined clutch and brake operatively associated with said crank to be actuated during the lost motion movement of the crank relative to its said driving connection to said clutch and brake, and means for adjusting the braking action.

20. In a fishing reel, the combination with a frame and spool, of a driving means for said spool including a combined clutch and brake, a crank having driving connection with said combined friction clutch and brake, means for controlling the braking action of said combined clutch and brake operatively associated with said crank to be controlled by the direction of rotation of the crank, and means for adjusting the braking action disposed on the outside of the frame and operatively associated with said crank.

RALPH W. MILLER.